No. 658,053. Patented Sept. 18, 1900.
A. B. WRIGHT.
AUTOMATIC APPARATUS FOR WEIGHING AND DELIVERING MILK.
(Application filed May 8, 1900.)
(No Model.) 2 Sheets—Sheet 1.
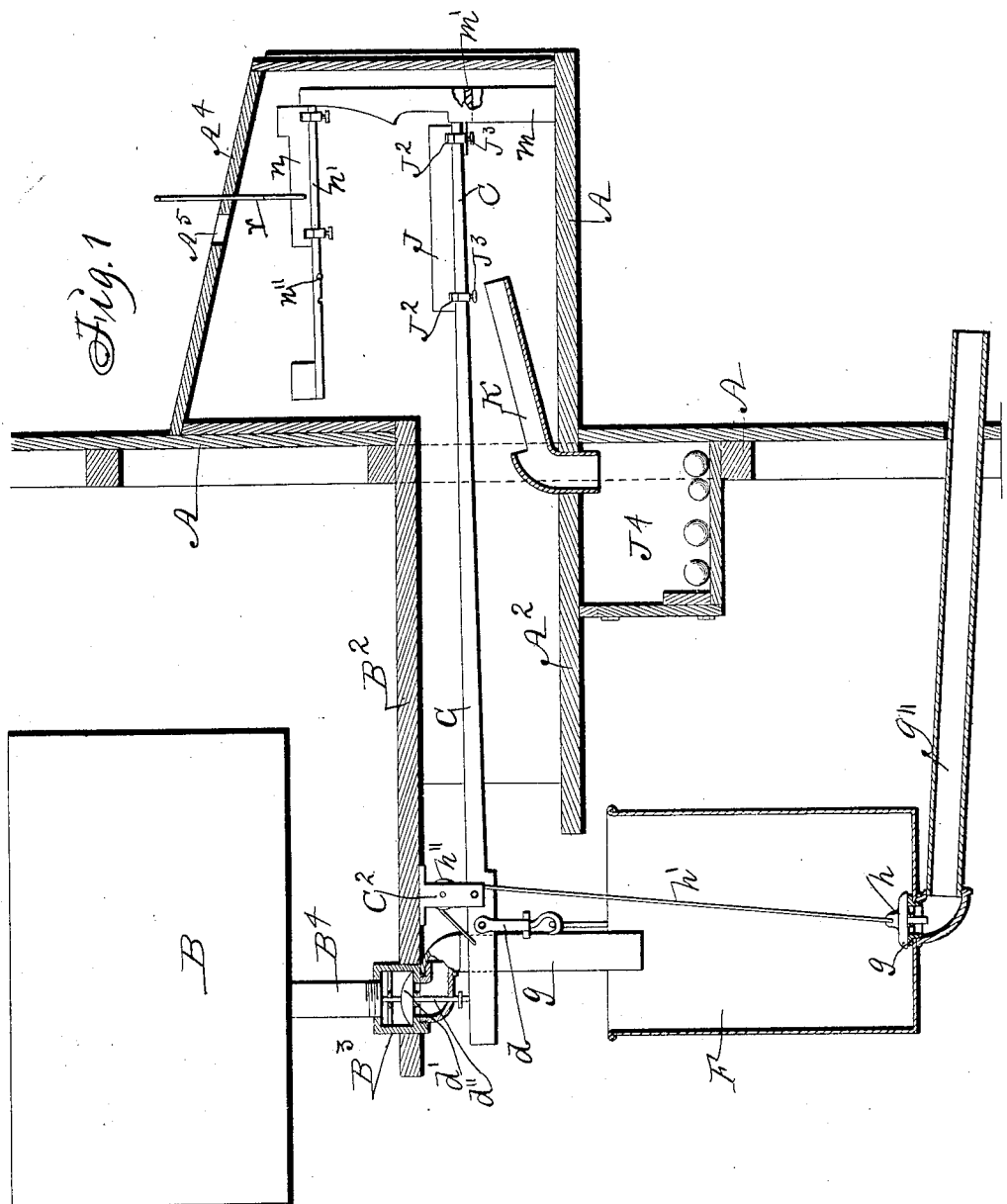

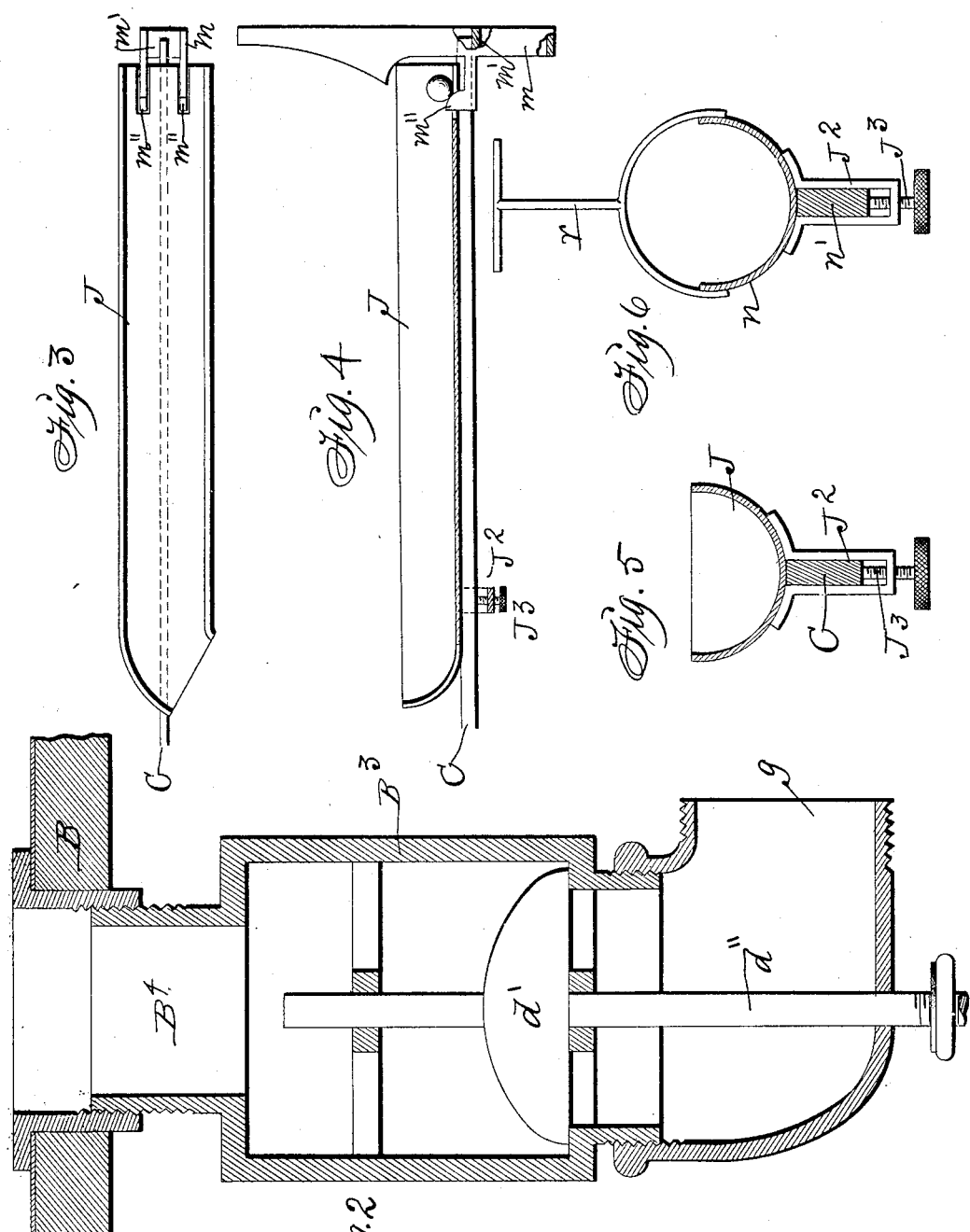

UNITED STATES PATENT OFFICE.

ABNER BENONI WRIGHT, OF GILBERT STATION, IOWA.

AUTOMATIC APPARATUS FOR WEIGHING AND DELIVERING MILK.

SPECIFICATION forming part of Letters Patent No. 658,053, dated September 18, 1900.

Application filed May 8, 1900. Serial No. 15,905. (No model.)

*To all whom it may concern:*

Be it known that I, ABNER BENONI WRIGHT, a citizen of the United States, residing at Gilbert Station, in the county of Story and State of Iowa, have invented a new and useful Automatic Apparatus for Weighing and Delivering Milk in a Creamery, of which the following is a specification.

When farmers deliver milk in cans to a creamery, they are given a ball-check for every one hundred pounds of milk or fractional part of a hundred. To utilize these checks for automatically weighing the skimmed milk that is to be returned to the farmers, I have provided an apparatus for weighing the skimmed milk as it is withdrawn from a tank into a measuring vessel to be emptied into the farmers' milk-cans, less the per cent. in weight of cream taken from the milk.

My invention consists in the construction, arrangement, and combination of operative weighing and measuring and conveying mechanism with a tank, as hereinafter set forth, pointed out in my claims, and illustrated in the accompanying drawings, in which—

Figure 1 is a vertical central sectional view of my apparatus, showing the forms and relative positions of the operative parts relative to a building in which it is located. Fig. 2 is an enlarged vertical sectional view of an automatic check-valve connected with a stationary tank and a tube for conveying milk from the tank into a measuring vessel suspended from a scale-beam. Fig. 3 is an enlarged top view of the ball-conveyer adjustably connected with the weighing-beam. Fig. 4 is a longitudinal sectional view on a central line of Fig. 3, showing the manner of connecting the ball-conveyer with the weighing-beam and the manner of restricting the downward motion of the front end of the beam. Fig. 5 is a transverse sectional view of the ball-receiver pivoted in a plane above the ball-conveyer on the beam. Fig. 6 shows a forked handle for operating the ball-receiver as required to drop a ball therefrom into the ball-conveyer.

The letter A designates the outer wall of a building that has an opening through which the floor $A^2$ of an extension extends inward.

$A^3$ is the front wall, and $A^4$ the inclined roof, of the extension that has an opening $A^5$, through which balls can be dropped by a person on the outside of the building into the balanced ball-receiver under the roof. A tank B for storing skimmed milk is located inside of the building above a floor $B^2$ and connected with a valve-chamber $B^3$, fixed in said floor, by means of a pipe $B^4$.

C is a weighing-beam pivoted to a support $C^2$, fixed to the under side of the platform $B^2$. A hook $d$ is pivoted to the short arm of the weighing-beam C, and a measuring vessel F is suspended on the hook. A check-valve $d'$ is located in the valve-chamber $B^3$ and has a fixed stem $d''$, fixed to the end portion of the beam $B^2$, as shown in Fig. 1, in such a manner that when the long arm of the beam is depressed by the weight of a check-ball the valve will be lifted to allow milk to pass downward through a tube $g$, fixed to the valve-chamber $B^3$, and from said tube into the measuring vessel F. A valve-seat $g'$ is fixed in an orifice in the bottom of the vessel and a tube $g''$, fixed thereto and to the bottom of the vessel, and extends out through the wall of the building in such a manner that a farmer's empty milk-can can be placed under the end thereof to be filled again and the skimmed milk carried back to his farm to be fed to calves and hogs. A valve $h$ is fitted to the valve-seat and connected with the short arm of the beam C by means of a cord $h'$, that extends over directing-pulleys $h''$, in such a manner that when the rear end of the beam is depressed by the weight of milk allowed to enter the vessel F the check-valve $d'$ will be closed and the valve $h$ opened, as required to allow the measured quantity of mik in the vessel F to flow out through the tube $g''$ into a milk-can placed under the end of the tube. A ball-conveyer J is adjustably connected with the end portion of the long arm of the weighing-beam by means of metal loops $J^2$, fixed thereto, as clearly shown in Fig. 5, in such a manner that when the end of the beam extends through the loops the ball-conveyer is slidably connected therewith. Screw-seats in the lower ends of the loops and set-screws $J^3$, fitted therein, serve as a means for clamping the ball-conveyer to the beam. A receptacle $J^4$ for check-balls is fixed inside of the wall A and under the floor $A^2$ and provided with an opening or hinged door for gaining access thereto for removing them. An inclined plane K, in the form of a trough having a curved tubular extension at its lower end, is fixed in the floor B², as required for conducting check-balls from the conveyer J into the receptacle J⁴. A post $m$, fixed to the floor A², is composed of two mating parallel parts. A web $m'$, at some distance above the bottom web, serves as a stop to restrict the downward motion of the front end of the beam C, and elbow-shaped keepers $m''$, integral with the mating sides of the post, extend through slots in the end of the ball-conveyer J, as shown in Figs. 3 and 4, in such a manner that a ball will be retained in the end of the conveyer until the weight of milk admitted in the vessel F will actuate the beam to elevate the conveyer J into an inclined position, as required to allow the check-balls to roll therefrom upon the inclined plane or trough K and from thence into the receptacle J⁴. A ball-receiver $n$ is adjustably connected with a lever $n'$, supported upon a bearer $n''$, fixed to the side walls of the extension on the outside of the wall A or in any suitable way, in such a manner that when a check-ball is dropped through the opening in the roof A⁴ it falls into the receiver $n$, and when the lever is depressed at its long end the ball will roll into contact with the curved front edges of the parallel parts of the post $m$, to be thereby directed so as to drop into the conveyer J. A stem $r$, extended through a hole in the roof A⁴, has a fork at its lower end adapted to stride the receiver $n$, as shown in Fig. 6, in such a manner that a downward pressure of the stem will tilt the ball-receiver as required for lowering the ball and delivering it into the conveyer J.

It is obvious all the check-balls received from a farmer for milk delivered to a creamery can be successively used for redelivering the skimmed milk by successively dropping them into the ball-receiver $n$ to actuate the automatic mechanism for discharging milk from the stationary reservoir or tank B into the measuring vessel F and from thence into the farmers' empty cans. It is also obvious that the weighing-beam and the weight of the balls may be so arranged relative to each other that any portion of the weight of the milk removed as cream will be automatically deducted from the quantity of the milk returned as skimmed milk.

Having described the construction, function, arrangement, and combination of all the operative parts, the practical operation and utility of my invention will be readily understood by persons familiar with the art to which it pertains, and

What I claim as new, and desire to secure by Letters Patent therefor, is—

1. In an apparatus for measuring and conveying milk, a tank a valve-chamber connected with the bottom of the tank, a valve fitted in the seat in the valve-chamber, a stem fixed to the valve and to the short arm of a weighing-beam, a measuring vessel suspended from the short arm of the beam and a tube connected with the valve-chamber to convey milk into the measuring vessel, a valve-seat in the bottom of the measuring vessel, a valve fitted to the seat, a cord fixed to the valve and extended over a directing-pulley and fixed to the short arm of the weighing-beam, arranged and combined to operate in the manner set forth for the purposes stated.

2. In an apparatus for measuring and conveying milk, a tank, a valve-chamber connected with the bottom of the tank, a valve fitted on the seat in the valve-chamber, a stem fixed to the valve and to the short arm of a weighing-beam, a measuring vessel suspended from the short arm of the beam and a tube connected with the valve-chamber to convey milk into the measuring vessel, a valve-seat in the bottom of the measuring vessel, a valve fitted to the seat, a cord fixed to the valve and extended over a directing-pulley and fixed to the short arm of the weighing-beam, and a tube fixed to the bottom of the measuring vessel to convey milk therefrom, arranged and combined to operate in the manner set forth for the purposes stated.

3. In an apparatus for measuring milk, a weighing-beam, an adjustable ball-conveyer on the long arm of the beam, an inclined plane or ball director under the inner end of the ball-conveyer on the beam and a ball-receptacle under the inclined ball-director, arranged and combined to operate in the manner set forth.

4. In an apparatus for measuring milk, a weighing-beam, an adjustable ball-conveyer on the long arm of the beam, an inclined plane or ball director under the inner end of the ball-conveyer on the beam and a ball-receptacle under the inclined ball-director, a fixed post at the end of the long arm of the beam composed of two mating parts and having a web to be engaged by the beam and elbow-shaped lateral projections to enter corresponding slots in the ball-conveyer and to engage a ball, and means for delivering a ball to the ball-conveyer, arranged and combined to operate in the manner set forth.

5. In an apparatus for measuring and conveying milk, a fixed post composed of two mating parts connected by a web at their central portion and having curved edges at their top portions and notches above their central portions, a scale-beam the end of the long arm of which moves adjacent to said curved edges said arm having a ball-receiver, and the weighted lever in a plane above the scale-beam arranged and combined as shown and described to operate in the manner set forth for the purposes stated.

6. An apparatus for measuring and conveying milk, comprising a tank in a building, a weighing-beam under the tank, a valve-chamber connected with the tank and provided with a stem fixed to the short arm of the weighing-beam, a vessel suspended from the short arm of said beam, a valve in the bottom of the vessel, a cord connected with the valve and extended over a pulley and connected with the short arm of the beam, a tube connected to the bottom of the vessel, a ball-conveyer on the end of the long arm of the beam, a post having a web to engage the front end of the beam and projections to engage a ball, a lever at the top of the post having a ball-receiver on its long arm and means for operating the lever to deliver a ball from the ball-receiver to the ball-conveyer on the beam, all arranged and combined to operate in the manner set forth for the purposes stated.

ABNER BENONI WRIGHT.

Witnesses:
O. L. GILBERT,
C. S. BRUBAKER.